United States Patent [19]

Maltby

[11] 3,778,705

[45] Dec. 11, 1973

[54] SUSCEPTANCE MEASURING SYSTEM FOR INDICATING CONDITION OF A MATERIAL

[75] Inventor: Frederick L. Maltby, Jenkintown, Pa.

[73] Assignee: Drexelbrook Controls, Inc., Horsham, Pa.

[22] Filed: May 24, 1971

[21] Appl. No.: 146,269

Related U.S. Application Data

[63] Continuation-in-part of Ser. No. 144,554, May 18, 1971, abandoned.

[52] U.S. Cl. .............................................. 324/61 R
[51] Int. Cl. .............................................. G01r 27/26
[58] Field of Search ................ 324/61 R; 73/304 C

[56] References Cited
UNITED STATES PATENTS 3,376,746  4/1968  Roberts ........................... 373/304 C
3,486,108  12/1969 Rosica et al. ..................... 324/61 R
3,218,551  11/1965 Cook ................................. 324/61 R

FOREIGN PATENTS OR APPLICATIONS 404,208  1/1969  Australia ........................... 324/61 R Primary Examiner—Alfred E. Smith
Attorney—Thomas M. Ferrill, Jr. et al.

[57] ABSTRACT

A system for measuring the condition of a material using a capacitive probe which is immersed in or placed in proximity to the material whose condition is to be measured, in which the probe exhibits both susceptive and conductive components, and in which means are provided for producing an indication representative of the susceptive component and substantially independent of the conductive component.

10 Claims, 5 Drawing Figures

INVENTOR.
FREDERICK L. MALTBY
BY
ATTORNEY

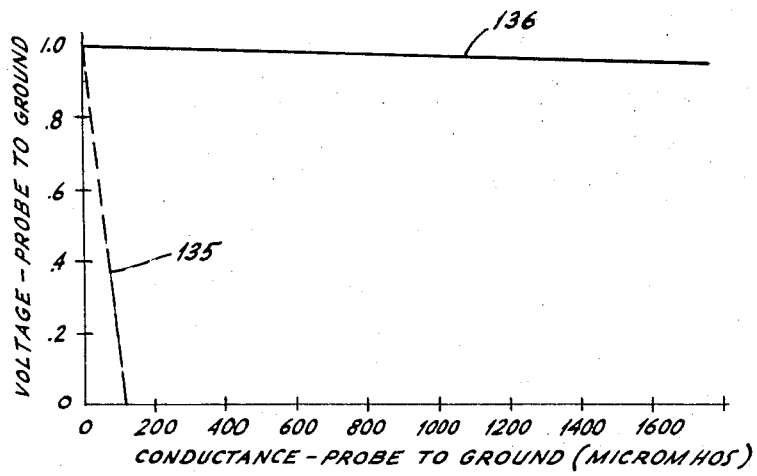
FIG. 2.
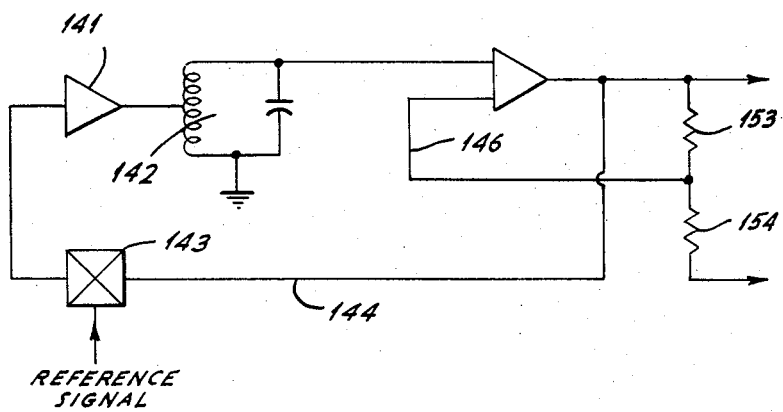
FIG. 4.
FIG. 5.
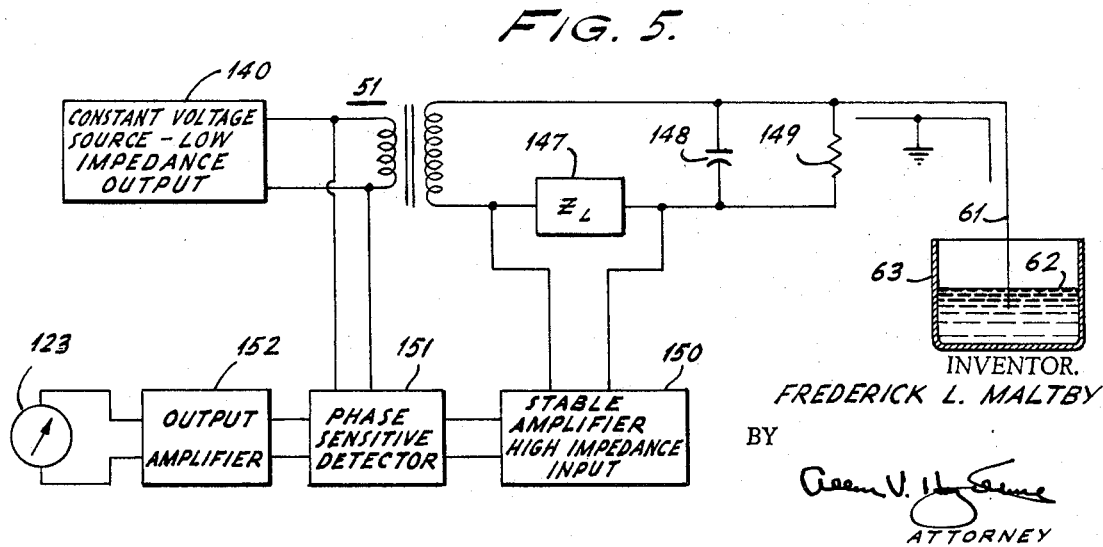
INVENTOR.
FREDERICK L. MALTBY
BY
ATTORNEY

INVENTOR.
FREDERICK L. MALTBY

SUSCEPTANCE MEASURING SYSTEM FOR INDICATING CONDITION OF A MATERIAL

This application is continuation-in-part of my co-pending application for Condition Measuring System, Ser. No. 144,554, filed May 18, 1971, and now abandoned.

This invention relates to improvements in systems for measuring the conditions of materials. More particularly it relates to such systems employing capacitive probes which are immersed in or placed in proximity to a material whose condition is to be measured. Thus systems are known, such as those disclosed in my prior U.S. Pat. No. 3,339,412 granted Sept. 5, 1967, for measuring the condition of a material, for example the level of a liquid, by means of a capacitive probe immersed in the liquid. As the level of the liquid varies, the capacitance exhibited by the probe varies and can be measured to provide an indication of the level of the liquid. Such systems have had the disadvantage that the impedance exhibited by the probe may not be purely reactive, but may include a resistive component which does not vary in direct relation to variations in the condition of the material to be measured. Thus, they tend to cause an erroneous indication of the condition (e.g., liquid level) which is being measured. If the material in which the probe is immersed is sticky, so that it tends to adhere to the probe even after the liquid level falls and the probe is no longer immersed in the material, the adhering material will tend to introduce a conductive component into the impedance exhibited by the probe which is not directly related to the level of the liquid in which the probe is immersed.

It is an object of the invention to overcome this difficulty and provide an accurate indication of the condition to be measured despite the presence of the conductive component in the probe impedance.

Another object of the invention is to provide a condition measuring system which is capable of being used to make measurements in materials which are wet and abrasive, such as wet sand. In prior systems this could only be accomplished by using a probe having an insulated film, for example of Teflon, which however was rapidly worn away by the abrasive material. The present invention permits the use of a bare, uninsulated probe, and therefore avoids this problem.

Another object of the invention is to provide a condition measuring system which is usable with materials which are sticky and tend to adhere to a probe.

Another object of the invention is to provide a system for measuring the interface between two immiscible materials, e.g., an organic material and a conductive material in which the probe is immersed, where the organic material itself is not a good insulator.

Yet another object of the invention is to provide a condition measuring system utilizing a capacitive probe in which the probe may be insulated with glass or other glass-like materials such a porcelain to permit it to be used under high temperature conditions, such as in boilers, where Teflon and other materials cannot be used for this purpose. Heretofore glass could not be used as an insulator because it was wet by aqueous materials, tending to leave a conducting film which affected the accuracy of the measurements.

In accordance with the invention, the foregoing objects are achieved by producing an indication representative of the capacitive variations of a probe and substantially independent of the conductive variations thereof. More particularly, in a preferred embodiment of the invention there is produced a signal representative of both the susceptive and the conductive components exhibited by the probe, and means are provided for deriving from said signal a signal representative essentially only of the susceptive component to the substantial exclusion of the conductive component.

The invention will be more fully understood from a consideration of the following detailed description thereof with reference to the drawings, in which:

FIG. 2 is a curve which will be referred to in explaining the invention;

FIG. 4 is a schematic diagram of a modification to a portion of the diagram of FIG. 1; and FIG. 5 is a block-schematic diagram of a modified version of the embodiment of FIGS. 1 and 3.

Figure 1:
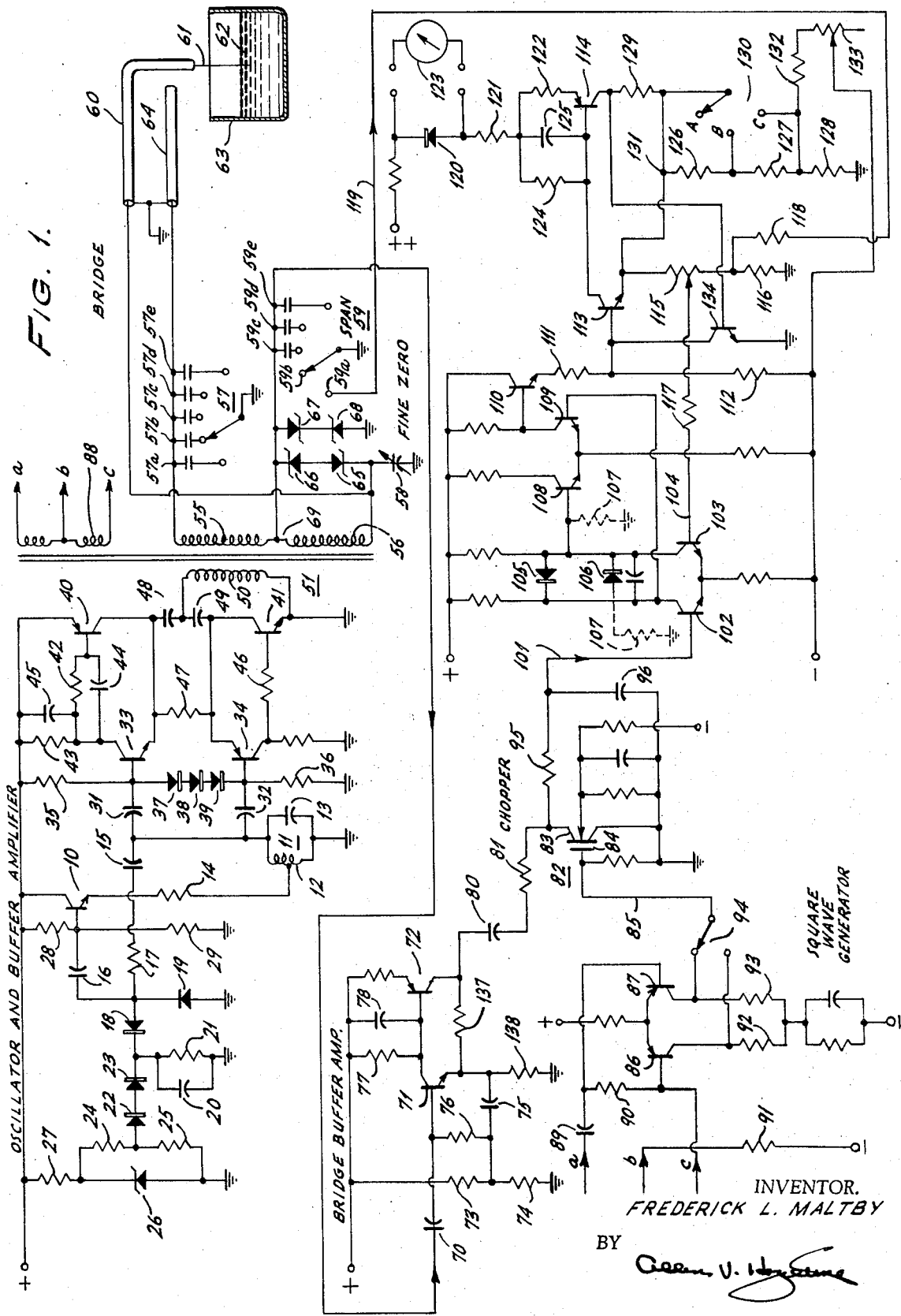
FIG. 1 is a schematic diagram illustrating a preferred embodiment of the invention.

Referring to FIG. 1, there is shown an oscillator comprising transistor 10 and tuned circuit 11 comprising inductor 12 and capacitor 13. The base of transistor 10 is appropriately biased by a suitable d-c potential provided by a voltage divider comprising resistors 28 and 29 serially connected between a source of positive potential and ground. The values of inductor 12 and condenser 13 of tuned circuit 11 may be chosen so as to cause the oscillator to operate at a frequency of, for example, 116 kilohertz. The emitter of transistor 10 is connected to a tap on inductor 12 through resistor 14, and signal from the ungrounded terminal of tuned circuit 11 is coupled back to the base of transistor 10 through coupling condensers 15 and 16 and current limiting resistor 17. The fed-back signal also is clipped on its positive and negative peaks by a circuit comprising divider 18 and 19 and the RC circuit comprising capacitor 20 and resistor 21. This clipper circuit is supplied with a stable d-c voltage through diodes 22 and 23 from a voltage divider comprising resistors 24 and 25 connected across a Zener diode 26 connected in series with resistor 27 between a source of positive potential and ground. Diodes 22 and 23 function to compensate for the effect of temperature variations on the operation of diodes 18 and 19. Thus, if the potential across diodes 18 and 19 varies when they are conducting, the drop in potential across diodes 22 and 23 will change to compensate for this. Thus there is provided a highly stable clipping circuit substantially independent of temperature and line voltage variations. The resultant clipped signal constitutes a highly stable reference signal which is compared with the unclipped signal supplied directly to the emitter of transistor 10, so that the net signal supplied to the base-emitter junction of that transistor is the difference between the unclipped and the clipped fed-back signals. In this manner the output of the oscillator developed at the tap on inductor 12 is maintained substantially equal to the fundamental component of the clipped signal supplied to the base of transistor 10. Because of the square waveform of the reference signal it has a high harmonic content. Therefore, to avoid producing a distorted waveform in the oscillator output, the gain of the oscillator circuit must be kept relatively low. However, if the output of this oscillator is then supplied to a circuit of the sort hereinafter described, it will be subject to very substantial voltage variations in response to the loading effect of such circuit which would lead to unsatisfactory operation of the circuit which it supplies. To avoid this difficulty, in accordance with the invention, the output of the oscillator is supplied to the subsequent circuits through a high gain amplifier employing substantially 100 percent feedback, as described hereinafter. Typically such amplifier may have an open-loop gain well in excess of 1,000. Thus there is provided, for use in the circuit according to this invention, a source of a distortion-free alternating signal of high stability. By reason of the high gain and high percentage of feedback the output impedance of the amplifier is maintained low so that the output voltage is maintained substantially constant over a wide range of variations of the load currents drawn by the subsequent circuitry. This is illustrated in FIG. 2 which is a plot of voltage measured from the probe to ground in the circuit as described hereinafter against the conductance measured from probe to ground. Curve 135 represents the variation in voltage which would be experienced if this output were taken directly from the oscillator, whereas curve 136 shows the effect of employing the low impedance output amplifier to supply the output from the oscillator to the subsequent circuits. As will be apparent, in the former case the output from the oscillator drops rapidly to zero for a loading of about 100 micromhos, whereas in the latter instance a loading as high as 1,600 micromhos produces a reduction of only about 5 percent in the source output, so that the susceptive component exhibited by the probe may be many times the conductive component without producing appreciable inaccuracies in the measurements made using the probe.

Returning now to FIG. 1, the details of the amplifier circuit in the preferred embodiment will be described. The output of the oscillator, developed across tuned circuit 11, is supplied through coupling capacitors 31 and 32 to the bases of transistors 33 and 34, respectively. Suitable operating potentials are applied to the bases of transistors 33 and 34 by a voltage divider arrangement comprising resistors 35 and 36 and diodes 37, 38 and 39 connected between a source of positive potential and ground. The diodes operate to maintain a fixed potential difference between the bases of transistors 33 and 34. The outputs of transistors 33 and 34, developed at their respective collectors, are supplied respectively to the bases of transistors 40 and 41 for amplification. In the case of transistors 33 and 40 the coupling includes a network comprising resistor 42 and condenser 44, which, together with resistor 43 and condenser 45, cooperate to reduce the gain of the two transistor stages for higher frequencies. In the case of transistors 34 and 41, the coupling is through resistor 46. By virtue of resistor 47 having one end connected to both the emitter of transistor 33 and the collector of transistor 40, and its other end connected to both the emitter of transistor 34 and the collector of transistor 41, feedback is provided from transistor 40 to transistor 33 and from transistor 41 to transistor 34. In the amplifier arrangement just described, consistent with what has been stated before, the open loop gain may be well in excess of 1,000 using conventional transistors and feedback is substantially 100 percent, as a result of which high stability and very low output impedance are obtained. The outputs of transistors 40 and 41, developed at their respective collectors, are supplied through coupling condensers 48 and 49, respectively, to the upper terminal of the primary winding of transformer 51, the lower terminal of which is grounded.

Secondary windings 55 and 56 of transformer 51 form two adjacent arms of a bridge circuit, the other two arms of which comprise a discretely variable capacitor and a continuously variable capacitor. The discretely variable capacitor comprises step switch 57 and associated capacitors 57a–57e connected between the upper terminal of secondary winding 55 and the taps on the switch, the movable switch contact being connected to ground. The other arm of the bridge comprises the continuously variable capacitor 58 connected between the lower terminal of secondary winding 56 and ground. The bridge output is developed between point 69, at the junction of the secondary windings 55 and 56, and ground across a capacitance determined by the position of step switch 59. Connected to the lower terminal of secondary winding 56 through coaxial cable 60 is the probe 61 for sensing the level of a material contained in a vessel 63. Connected to the upper terminal of secondary winding 55 is a further section of coaxial cable 64 corresponding substantially in length to the cable 60 and functioning as a dummy impedance to compensate for the unbalancing effect of the impedance of coaxial cable 60 in the adjacent arm of the bridge. Across the secondary winding 56 are connected a pair of serially connected Zener diodes 65 and 66, and also connected from the upper terminal 69 of secondary winding 56 are a second pair of serially connected Zener diodes 67 and 68. These diodes cooperate to dissipate any excessive static charge developed on probe 61 which might adversely affect the operation of the bridge circuit and the accuracy of the measurements made therewith. Because diodes 65 and 66 are connected across the low impedance transformer winding they will have no effect on the bridge output. Similarly, because diodes 67 and 68 are effectively in parallel with variable capacitor 59, the capacitance of which is much larger, they will have minimal effect on the bridge output.

The bridge output, developed between point 69 and ground, is supplied through coupling capacitor 70 to the input of a bridge buffer amplifier comprising transistors 71 and 72 connected in cascade. Operating bias is supplied to the base of transistor 71 from a voltage divider comprising resistors 73 and 74 through resistor 76, and feedback is provided from the output transistor 72 to the input transistor 71 through resistor 137 which stabilizes the amplifier gain and raises the transistor input impedance. This feed back voltage is also applied through capacitor 75 to the junction of resistors 73, 74 and 76 which increases the effective value of resistor 76 and minimizes shunting of the amplifier input.

Condenser 78, shunting resistor 77, operates to bypass high frequencies so as to prevent high frequency oscillations in the amplifier comprising transistors 71 and 72. The output of the bridge buffer amplifier, appearing on the collector of transistor 72, is supplied through a coupling capacitor 80 and a current limiting resistor 81 to the drain electrode 83 of a field effect transistor 82 connected in a chopper circuit. The other input to the chopper is a square wave at the same frequency as the bridge supply oscillator supplied to the gate electrode 84 of field effect transistor 82 via conductor 85 from a square wave generator which will now be described.

The square wave generator comprises a pair of transistors 86 and 87 operating essentially as switches in response to a signal supplied between their bases from secondary winding 88 of transformer 51 through a coupling network comprising capacitor 89 and resistor 90, the center tap of winding 88 being connected to a point of negative potential through resistor 91. Opposite phases of square wave output are developed across resistors 92 and 93 respectively connected in the collector circuits of transistors 86 and 87. Either phase of output may be supplied through conductor 85, depending upon the position of single-pole-double-throw switch 94, to the input of the chopper depending upon which one of two alternative results are desired as will be explained hereinafter.

As will be explained hereinafter, the chopper develops across capacitor 96 a d-c potential whose magnitude is dependent upon the magnitude of the in-phase component of the signal supplied to it from the bridge buffer amplifier comprising transistors 71 and 72. Resistor 95 cooperates with capacitor 96 to smoothe the d-c output from the chopper.

The chopper output is supplied through conductor 101 to the input of a d-c output amplifier. More particularly it is supplied to the base of transistor 102 which cooperates with transistor 103, whose base is supplied with a fed back signal from the output of the amplifier through conductor 104, to provide a differential amplifier with output appearing at the collectors of transistors 102 and 103. Diodes 105 and 106 are connected in opposite polarities between the collectors of transistors 102 and 103 to limit the voltage difference which may exist between the collectors. Also there is provided a resistor 107 connected between the collector of one of the two transistors 102, 103 and ground. The magnitude of this resistor and the point of its connection is determined experimentally in a manner which will be explained hereinafter. The outputs appearing on the respective collectors of transistors 102 and 103 are supplied respectively to the bases of transistors 108 and 109, also cooperating to provide a differential amplifier. The output appearing on the collector of transistor 109 is in turn supplied to the base of transistor 110 operating as an emitter-follower buffer stage. The output appearing in the emitter circuit is divided down by means of a voltage divider comprising resistors 111 and 112, and the d-c voltage appearing across resistor 112 is supplied to the base of transistor 113 which, together with transistor 114, comprises a two-stage amplifier similar to those heretofore described.

Between the emitter of transistor 113 and ground are serially connected resistors 115 and 116, the former being provided with an adjustable tap from which a voltage may be fed back through resistor 117 and conductor 104 to the base of transistor 103 as previously mentioned. This provides the feedback desired to stabilize the operation of the output amplifier and adjust the gain. Also there is provided a connection from the junction of resistors 115 and 116 through resistor 118 and conductor 119 to tap 59a of step switch 59. When the movable arm of this switch contacts tap 59a, resistor 116 will be shunted by resistor 118 which will have the tendency of reducing the feedback in the amplifier and increasing its gain for a purpose which will be explained hereinafter. The output from transistor 114 appears across diode 120 connected in series with resistors 121 and 122 in the emitter circuit of transistor 114 and may be supplied to meter 123 to indicate the magnitude of such output. Diode 120 operates to protect meter 123 against possible reversals of polarity of the voltage applied to it by an inductive load. RC circuit 124, 125 connected from the base of transistor 114 to the junction of resistors 121 and 122 operates to bypass high frequency components and prevent high frequency oscillations in the amplifier as hereinbefore discussed with reference to other amplifiers in the system. Connected from the emitter of transistor 113, and from the collector of transistor 114 through resistor 129, to ground is a series combination of resistors 126, 127 and 128. A step switch 130 is provided so that either resistor 126 or resistors 126 and 127 may be shorted out to vary the amount of resistance between point 131 and the junction of resistors 127 and 128 and thereby provide for different ranges of indication by meter 123. Also a connection is provided from the junction of resistors 127 and 128 through a resistor 132 to a potentiometer 133 having a variable tap connected to a point of negative potential for varying the output current zero point, which remains fixed and is independent of the setting of potentiometer 115. Transistor 134 has its base connected to the collector of transistor 114, its collector connected to the base of transistor 113, and its emitter connected to ground and operates as a bypass at the input of transistor 113 for excessively large signals.

Figure 3:
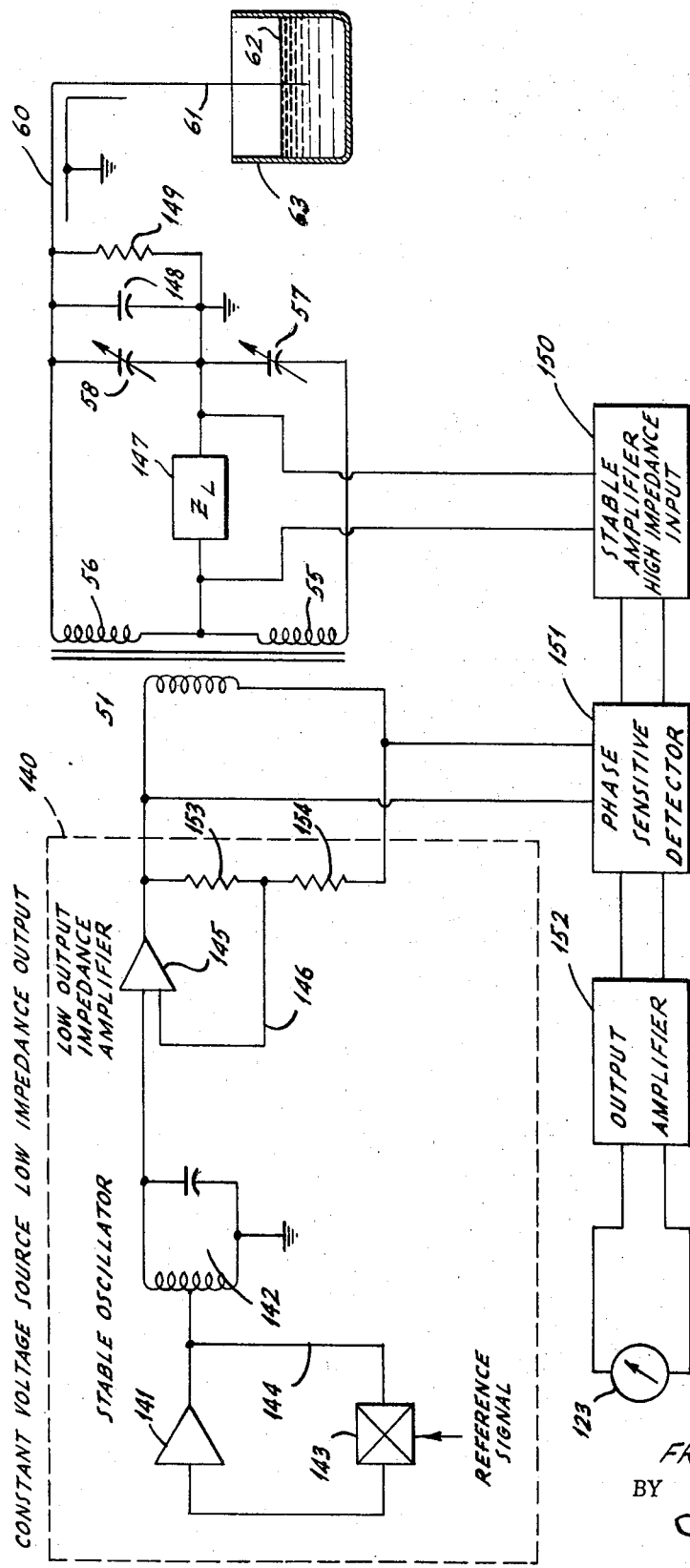
FIG. 3 is a simplified block-schematic diagram of the embodiment of FIG. 1.

Considering now the operation of the system as a whole, reference is made to FIG. 3 which is a simplified block schematic diagram of the system shown in FIG. 1. The constant voltage source with low impedance output 140 is shown comprising a stable oscillator consisting of amplifier 141, tuned circuit 142 and a comparator 143 to which the output developed across tuned circuit 142 is supplied through connection 144, and to which, as indicated, a reference signal is supplied. The difference signal resulting from the comparison is supplied to the input of amplifier 141. The output of the stable oscillator, as in the system of FIG. 1, is supplied to the input of a low output impedance amplifier 145 provided with a feedback connection 146. The stable oscillator and low output impedance amplifier correspond to the oscillator and buffer amplifier comprising transistors 10, 33, 34, 40 and 41 in FIG. 1, the output of which is supplied to the primary winding 50 of transformer 51 having secondary windings 55 and 56, these being the same reference numerals used to identify corresponding windings in FIG. 1. As in FIG. 1, the secondary windings 55 and 56 form adjacent arms of a bridge circuit. Capacitors 57 and 58 forming the two remaining arms of the bridge, correspond to the similarly identified capacitors in FIG. 1. Impedance $Z_L$ connected across the output terminals of the bridge corresponds to the discretely variable (span) capacitor 59 of FIG. 1. Capacitor 148 and resistor 149 represent respectively the susceptive and conductive components exhibited by the probe 61 and its associated connecting cable 60. Stable amplifier 150, having a high impedance input, corresponds to the bridge buffer amplifier comprising transistors 71 and 72 in FIG. 1. Phase sensitive detector 151 corresponds to the chopper circuit, comprising the field effect transistor 82, and the square wave generator comprising transistors 86 and 87 in FIG. 1. The output amplifier 152 corresponds to the amplifier comprising transistors 102, 103, 108, 109, 110, 113, 114 and 134 in FIG. 1. Meter 123 bears the same reference number as the corresponding meter in FIG. 1.

Whereas the embodiment of FIG. 1 shows 100 percent feedback around the low output impedance amplifier, the system could function with less than 100 percent feedback in this embodiment by making resistor 153 greater than zero.

Since the voltage source 140 comprises the stable oscillator and the low output impedance amplifier, as hereinbefore discussed, its output impedance will be very low compared to the impedance exhibited by the probe 61 and hence its output voltage will remain constant over a wide range of variations in the conductive component 149 of that impedance. Also this arrangement insures that the frequency of the signal supplied to the bridge circuit will be substantially constant, which is important in avoiding undesired variations in the ratio of the susceptive component to the conductive component exhibited by the probe 61, which would tend to produce inaccurate measurements. If the impedance $Z_L$ is maintained very much lower than the impedance exhibited by the probe, then there will appear across impedance $Z_L$ a signal having components in quadrature whose amplitudes respectively represent the susceptive and conductive components exhibited by the probe 61. The susceptive component will vary substantially in accordance with variations in the level 62 of the liquid or other material in the vessel 63, but in general the conductive component will not vary directly in accordance with such level variations and hence would tend to produce erroneous measurements of the liquid level unless eliminated. Thus, if the liquid or other material in which the probe is immersed is sticky, so that it tends to adhere to the probe after the probe is withdrawn from it, once the probe has been fully immersed in the material, it will display a constant conductive component regardless of variations in the level of the material. By detecting only the in-phase quadrature component of the signal developed across impedance 147, and ignoring the other quadrature component representative of conductance, and accurate measurement of the probe susceptance, and hence the liquid level, can be obtained regardless of the presence of the conductive component. This is accomplished by supplying the signal developed across impedance 147 to a stable amplifier having a very high impedance input compared to that of impedance 147. The output of this amplifier in turn is supplied to the phase sensitive detector 150 which is made responsive only to the quadrature component representative of the probe susceptance, the magnitude of which is indicated by meter 123.

In operating the system as illustrated in FIGS. 1 and 2, the bridge is first adjusted for a zero reading by varying capacitors 57 and 58 prior to immersion of probe 61 in the material whose condition is to be measured. Step switch 59 of FIG. 1 is set to an appropriate position depending upon the range of variation in probe susceptance expected to be experienced. If the range variation is small, the movable contactor is set on tap 59a, in which condition, as previously explained, the gain of the output amplifier is increased so as to provide a maximum output corresponding to a full scale reading on meter 123. If a somewhat larger variation is expected, the step switch contact arm is placed on tap 59b, which does not alter the gain of the amplifier and does not add any additional capacitance across the bridge output terminals. For successively larger outputs, the switch arm is moved to one of positions 59c, 59d or 59e to introduce successively larger amounts of capacitance across the bridge output terminals to provide an optimum full scale meter reading.

Prior to operation of the system, certain adjustments should be made in the output amplifier. To do this, the base of transistor 102 in the input to that amplifier is connected to ground to represent a zero input signal, and potentiometer 133 is then adjusted to provide an output of approximately 4 milliamperes through a meter 123 (the nominal value adopted in the industry for zero output). Potentiometer 115 is then varied to note its effect on the output, and while this is done the value of resistor 107 and its location is selected so that no variation in output is produced by variation of potentiometer 115. The output amplifier is then adjusted for optimum operation. Depending on the position of switch 34 connected between the output of the square wave generator and the input to the chopper, the output of the chopper may be caused to either increase or decrease in response to increases in the measured probe susceptance, and similarly the output at meter 123 will either increase or decrease depending on the positioning of switch 94.

While, in the arrangement of FIG. 3, the comparator 143 is shown as receiving signal fed back through connection 144 from the oscillator output developed across tuned circuit 142, this may be varied, as shown in FIG. 4, by deriving the feedback signal from the output of amplifier 145.

Using a system according to the present invention, it is possible to make accurate measurements even when the conductive component exhibited by the probe is much larger than the susceptive component. Typically it is possible to make accurate measurements when the conductance exhibited by the probe is 25 times as large as the maximum susceptance exhibited thereby, and there is no reason to believe that this constitutes an upper limit. In cases where the conductance component of the material is greater than what is tolerable, the system can still be used with a probe covered by a thin insulating film to reduce as much as possible the magnitude of the conductive component exhibited by the probe. However, it also is feasible to use an uninsulated probe where it is desirable to do so--as, for example, in wet abrasive material such as sand which would tend to destroy the insulation on the probe, provided the conductance component does not exceed the tolerable limit. Also it is feasible to use a probe with insulation of glass or glasslike material without adverse results arising from surface tension as hereinbefore mentioned.

While it is preferable to use a bridge circuit as illustrated in FIGS. 1 and 3 in practicing the invention to gain the advantages of convenient compensation for the residual capacitance of the probe and its associated connecting cable, the invention also can be practiced with a much simpler arrangement of the sort shown in FIG. 5, not involving the use of a bridge circuit. In this arrangement the constant voltage source 140, the stable high impedance buffer amplifier 150, the phase sensitive detector 151 and the output meter 123 may all be essentially the same as those in the embodiment of FIG. 1. However, instead of using the bridge circuit, the output from transformer 51 is applied across a circuit comprising the parallel combination of the susceptive and conductive components 148 and 149 of the probe impedance in series with impedance $Z_L$, which as previously should be very small compared to the probe impedance in order that there will be produced thereacross the desired quadrature components.

Also it should be noted that, while in the embodiment of FIG. 1 the impedance $Z_L$ of FIG. 3 is shown as capacitive, it equally well may be resistive, and the same is true with respect to the impedance $Z_L$ in the embodiment of FIG. 5.

While the invention has been described with reference to certain preferred embodiments, it will be apparent that many changes may be made and many widely different embodiments may be constructed without departing from the scope of the invention, which is defined by the following claims:

What is claimed is:

1. A condition measuring system for detecting changes in the condition of a material by observing changes in the susceptance exhibited by a capacitive probe immersed in said material or in proximity thereto, said system being particularly adapted for measuring the condition of a material of relatively high conductivity such that a capacitive probe immersed therein exhibits not only a susceptive component related to the condition to be measured, but also a substantial conductive component which may be unrelated to the condition to be measured, said system comprising in combination a series circuit including:
   a. a capacitive probe for immersion in said material whose condition is to be measured,
   b. an impedance which is very low compared to the impedance of said probe, and
   c. a source of an alternating voltage for energizing said series circuit, said source being adapted to provide a voltage of substantially constant amplitude and frequency to said series circuit even though the conductive component exhibited by said probe may exceed substantially the susceptive component exhibited thereby, said source comprising a highly stable oscillator and an amplifier connecting the output of said oscillator to said series circuit, said amplifier having a high open loop gain and high feedback such as to provide an output impedance for said amplifier which is low compared to the impedance presented by said series circuit, said oscillator comprising a second amplifier having an output connected to a tuned circuit, means for comparing the signal developed in said tuned circuit with a reference signal to develop a difference signal, and means for supplying said difference signal to the input of said second amplifier, said second amplifier having a gain low compared to the gain of said first amplifier,
   and means for deriving from said serially connected impedance a signal representative of the susceptive component of the current in said probe to the substantial exclusion of the conductive component of current therein.

2. A system according to claim 1 in which said signal developed in said tuned circuit is clipped prior to comparison with said reference signal and in which the gain of said second amplifier is sufficiently low to prevent generation of appreciable harmonic components in the output of said oscillator.

3. A system according to claim 1 in which the open loop gain of said first amplifier is in excess of 1,000 and in which said amplifier is provided with substantially 100 percent feedback.

4. A system according to claim 1 in which said first amplifier is included in the feedback path of said oscillator.

5. A system according to claim 1 including a bridge circuit in which said capacitive probe is connected in one arm of said bridge and said serially connected impedance is connected across the output terminals of said bridge circuit.

6. A system according to claim 5 having a variable capacitance in at least one arm of said bridge arranged to balance out residual capacitance exhibited by said probe when it is not in contact with or in proximity to a material whose condition is to be measured.

7. A system according to claim 5 having impedance means connected to one input terminal of said bridge for compensating for the impedance of lead means connecting said probe to the other input terminal of said bridge.

8. A system according to claim 5 including means for dissipating static charges developed on said probe, said dissipating means comprising voltage limiting means shunting an arm of said bridge adjacent that in which said probe is connected, and further voltage limiting means connecting to ground the terminal of said first voltage limiting means remote from the bridge arm in which said probe is connected.

9. A system according to claim 5 having means for balancing out residual capacitance exhibited by said probe when it is not in contact with or in proximity to a material whose condition is to be measured, said means comprising a capacitance in one arm of said bridge adjustable in steps to provide a coarse adjustment, and a continuously adjustable capacitance in another arm of said bridge for providing a fine adjustment.

10. A system according to claim 1 in which said last means includes a high-gain amplifier having its input connected across said serially connected impedance and having a portion of its output fed back to its input in phase opposition to the signal applied to its input.

* * * * *